United States Patent
Yu et al.

(10) Patent No.: US 11,558,131 B2
(45) Date of Patent: Jan. 17, 2023

(54) METHOD AND APPARATUS FOR MEASURING WIRELESS PERFORMANCE OF RECEIVER OF WIRELESS TERMINAL

(71) Applicant: GENERAL TEST SYSTEMS INC., Guangdong (CN)

(72) Inventors: Wei Yu, Guangdon (CN); Yihong Qi, Guangdon (CN); Penghui Shen, Guangdong (CN)

(73) Assignee: GENERAL TEST SYSTEMS INC., Shenzhen (CN)

( * ) Notice: Subject to any disclaimer, the term of this patent is extended or adjusted under 35 U.S.C. 154(b) by 73 days.

(21) Appl. No.: 16/901,280

(22) Filed: Jun. 15, 2020

(65) Prior Publication Data

US 2020/0366390 A1 Nov. 19, 2020

Related U.S. Application Data

(63) Continuation of application No. PCT/CN2018/123154, filed on Dec. 24, 2018.

(51) Int. Cl.
*H04W 72/04* (2009.01)
*H04B 17/318* (2015.01)
(Continued)

(52) U.S. Cl.
CPC ......... *H04B 17/318* (2015.01); *H04B 17/336* (2015.01); *H04L 1/203* (2013.01); *H04W 52/20* (2013.01); *H04W 52/245* (2013.01)

(58) Field of Classification Search
CPC .... H04B 17/318; H04B 17/12; H04B 17/336; H04B 17/345; H04B 17/29; H04B 7/0413;
(Continued)

(56) References Cited

U.S. PATENT DOCUMENTS

| 2008/0056340 A1* | 3/2008 | Foegelle | H04B 17/29 375/224 |
| 2008/0129615 A1* | 6/2008 | Breit | H04B 17/15 343/703 |

(Continued)

FOREIGN PATENT DOCUMENTS

| CN | 102148885 | 8/2011 |
| CN | 102237933 | 11/2011 |

(Continued)

OTHER PUBLICATIONS

Chinese Office Action dated Aug. 14, 2019 for Application No. 201810030667.4, 11 pages.

(Continued)

*Primary Examiner* — Mahbubul Bar Chowdhury
(74) *Attorney, Agent, or Firm* — Frost Brown Todd LLC

(57) ABSTRACT

Disclosed are a method and apparatus for measuring wireless performance of a receiver of a wireless terminal, and a non-transitory computer readable storage medium. The method includes the following. A measured signal of a receiver to be measured is determined. Measured signals of other receivers except the receiver to be measured are zero. Multiple transmitted signals are determined based on the measured signals. The multiple transmitted signals are transmitted through multiple measurement antennas. When a bit error rate of the receiver to be measured does not equal a preset bit error rate, the measured signal is adjusted, determining the multiple transmitted signals based on the updated measured signal. When the bit error rate equals the preset error rate, a power of the measured signal is determined as the radiant sensitivity of the receiver to be measured.

18 Claims, 8 Drawing Sheets

(51) Int. Cl.
*H04B 17/336* (2015.01)
*H04L 1/20* (2006.01)
*H04W 52/20* (2009.01)
*H04W 52/24* (2009.01)

(58) Field of Classification Search
CPC ........ H04B 17/20; H04B 17/21; H04B 17/23; H04B 17/24; H04B 17/26; H04B 17/27; H04L 1/203; H04L 1/24; H04W 52/20; H04W 52/245; H04W 24/08
See application file for complete search history.

(56) References Cited

U.S. PATENT DOCUMENTS

| | | | | |
|---|---|---|---|---|
| 2008/0311871 | A1* | 12/2008 | Qi | H04B 17/29 |
| | | | | 455/226.2 |
| 2009/0318103 | A1* | 12/2009 | Feenaghty | H04B 17/327 |
| | | | | 455/226.3 |
| 2010/0203880 | A1* | 8/2010 | Sotoudeh | H04B 17/3911 |
| | | | | 455/423 |
| 2011/0136485 | A1* | 6/2011 | Gordiyenko | H04B 17/309 |
| | | | | 455/424 |
| 2012/0275506 | A1* | 11/2012 | Ding | H04B 17/3911 |
| | | | | 375/224 |
| 2015/0280844 | A1* | 10/2015 | Yu | H04B 17/0085 |
| | | | | 375/224 |
| 2019/0173593 | A1* | 6/2019 | Chapman | H04B 17/102 |

FOREIGN PATENT DOCUMENTS

| | | | | |
|---|---|---|---|---|
| CN | 102244549 | | 11/2011 | |
| CN | 103856272 | | 6/2014 | |
| CN | 106341831 | A * | 1/2017 | |
| CN | 108307421 | | 7/2018 | |
| JP | 2012-090049 | A | 5/2012 | |
| KR | 10-2015-0086532 | A | 7/2015 | |
| WO | WO-2012108124 | A1 * | 8/2012 | ............. H04B 17/29 |

OTHER PUBLICATIONS

International Search Report and Written Opinion dated Mar. 26, 2019 for Application No. PCT/CN2018/123154, 13 pages.
Hussain, A. et al., "Interpreting the Total Isotropic Sensitivity and Diversity Gain of LTE-enabled wireless devices from Over the Air Throughput Measurements in Reverberation Chambers," IEEE Access, vol. 3, pp. 131-145.
Korean Office Action dated Jun. 4, 2021 for Application No. 10-2020-7019076, 11 pages.

* cited by examiner

METHOD AND APPARATUS FOR MEASURING WIRELESS PERFORMANCE OF RECEIVER OF WIRELESS TERMINAL

CROSS-REFERENCE TO RELATED APPLICATIONS

This application is a continuous application of International Application No. PCT/CN2018/123154, filed on Dec. 24, 2018, which claims priority to and benefits of Chinese Patent Application Serial No. 201810030667.4, filed on Jan. 12, 2018, the entire contents of which are incorporated herein by reference.

FIELD

The present application relates to a field of communications, and more particularly, to a method for measuring wireless performance of a receiver of a wireless terminal, an apparatus for measuring wireless performance of a receiver of a wireless terminal, and a computer-readable storage medium.

BACKGROUND

A MIMO (multiple-input multiple-output) wireless terminal (e.g. a mobile phone, a notebook computer, etc.) includes basic components such as a receiver. The wireless terminal may be subjected to various performance detection including a wireless performance detection of the receiver.

SUMMARY

The present disclosure provides a method for measuring the wireless performance of the receiver of the wireless terminal. The method includes: determining a measured signal of a receiver to be measured, in which the wireless terminal includes multiple receivers and measured signals of the receivers except the receiver to be measured in the multiple receivers are zero; determining multiple transmitted signals based on the measured signal; transmitting the multiple transmitted signals through multiple measurement antennas; determining whether a bit error rate of the receiver to be measured equals a preset bit error rate; in response to determining that the bit error rate does not equal the preset bit error rate, adjusting the measured signal and returning to determining the multiple transmitted signals based on the measured signal; and in response to determining that the bit error rate equals the preset bit error rate, determining a power of the measured signal as a radiation sensitivity of the receiver to be measured.

The present disclosure further provides an apparatus for measuring wireless performance of a receiver of a wireless terminal. The apparatus includes: a anechoic chamber including multiple measurement antennas; and a controller, configured to: determine a measured signal of a receiver to be measured, the wireless terminal including multiple receivers, and measured signals of receivers except the receiver to be measured in the multiple receivers are zero; determine multiple transmitted signals based on the measured signal; transmit the multiple transmitted signals through the multiple measurement antennas; determine whether a bit error rate of the receiver to be measured equals a preset bit error rate; in response to determining that the bit error rate does not equal the preset bit error rate, adjust the measured signal, and return to determining the multiple transmitted signals based on the measured signal; and in response to determining that the bit error rate equals the preset bit error rate, determine a power of the measured signal as a radiation sensitivity of the receiver to be measured.

The present disclosure further provides a non-transitory computer-readable storage medium, having a computer program stored thereon. When the computer program is executed by a processor, the method as defined in embodiments of the first aspect is executed.

DETAILED DESCRIPTION

Figure 1:
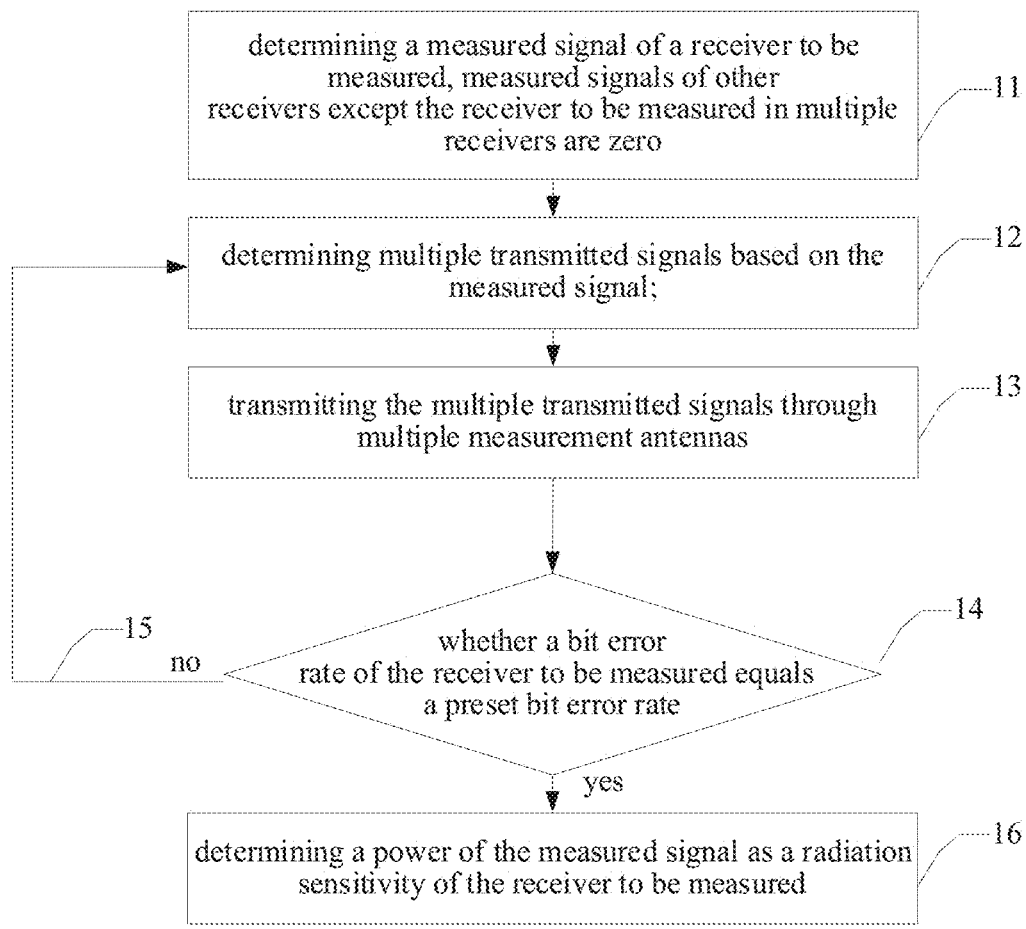
FIG. 1 is a flow chart illustrating a method for measuring wireless performance of a receiver of a wireless terminal according to embodiments of the present disclosure.

Sensitivity defines a lowest signal strength that the receiver may receive and may function properly. The sensitivity is a power level. The sensitivity of the receiver is often determined by detecting a bit error rate (BER). The bit error rate refers to a ratio of the number of erroneous data packets to the total number of transmitted data packets after the signal is received by the receiver, which is often expressed as a percentage. Taking a global system for mobile communication (GSM) protocol as an example, an input power of the receiver that enables the receiver operates at the BER of 2.44% is the sensitivity. Determination of the sensitivity of the receiver is necessary and important, especially in a modern digital communication system.

Relation between transmitted signals for measurement (i.e., signals transmitted by measurement antennas) and measured signals will be described in the present disclosure. For example, a MIMO wireless terminal (hereinafter DUT for short) includes m receivers and an anechoic chamber includes n measurement antennas, where n and m are positive integers greater than or equal to 2. The measured signals at input ports $R_1, R_2, \ldots R_m$ of the m receivers are $T_1, T_2, \ldots T_m$ respectively. The transmitted signals are $MT_1, MT_2, \ldots MT_n$ respectively. The relation between the transmitted signals and the measured signals satisfies a following formula:

$$\begin{bmatrix} T_1 \\ T_2 \\ \vdots \\ T_m \end{bmatrix} = \begin{bmatrix} a_{11} & a_{12} & \ldots & a_{1n} \\ a_{21} & a_{22} & \ldots & a_{2,n} \\ \vdots & \vdots & \ddots & \vdots \\ a_{m1} & a_{m2} & \ldots & a_{mn} \end{bmatrix} * \begin{bmatrix} MT_1 \\ MT_2 \\ \vdots \\ MT_n \end{bmatrix}. \quad (1)$$

$$\text{Let, } A = \begin{bmatrix} a_{11} & a_{12} & \ldots & a_{1n} \\ a_{21} & a_{22} & \ldots & a_{2n} \\ \vdots & \vdots & \ddots & \vdots \\ a_{m1} & a_{m2} & \ldots & a_{mn} \end{bmatrix},$$

where A represents a channel transfer matrix from the n measurement antennas to the input ports of the m receivers, $a_{ij}$ represents a path complex gain from the measurement antenna j to the receiver i, $a_{ij}=G(tx\_antj,ij)+P_{ij}+G(rx\_anti,ij), i=1,2,\ldots, m; j=1,2,\ldots,n$; $G(tx\_antj,ij)$ represents a gain of the measurement antenna j to the receiver i, $G(rx\_anti,ij)$ represents a gain of the receiving antenna of the receiver i to the measurement antenna j, $P_{ij}$ represents a spatial path loss from the measurement antenna j to the receiver i.

A combination of a position of the DUT and positions of the measurement antennas may always be found such that the channel transfer matrix is non-singular.

Accordingly, the transmitted signals may be determined as:

$$\begin{bmatrix} MT_1 \\ MT_2 \\ \vdots \\ MT_n \end{bmatrix} = \begin{bmatrix} a_{11} & a_{12} & \ldots & a_{1n} \\ a_{21} & a_{22} & \ldots & a_{2n} \\ \vdots & \vdots & \ddots & \vdots \\ a_{m1} & a_{m2} & \ldots & a_{mn} \end{bmatrix}^{-1} * \begin{bmatrix} T_1 \\ T_2 \\ \vdots \\ T_m \end{bmatrix}, \quad (2)$$

in this case, the transmitted signals are outputted to the measurement antennas via a measurement instrument. When the transmitted signals radiated through the measurement antennas reach the input ports of the receivers of the DUT through the channel transfer matrix A, the signal actually received by any one of the receivers is the measured signal of that receiver.

As illustrated in FIG. 1, the method for measuring wireless performance of a receiver of a wireless terminal may include the following.

At block 11, the measured signal of the receiver to be measured is determined. The wireless terminal includes multiple receivers, and measured signals of the other receivers except the receiver to be measured in the multiple receivers are zero.

In embodiments of the present disclosure, the wireless terminal is placed in the anechoic chamber. The anechoic chamber includes the multiple measurement antennas.

At block 12, the multiple transmitted signals are determined based on the measured signal.

In detail, the channel transfer matrix from the multiple measurement antennas to the multiple receivers is determined, and the multiple transmitted signals are obtained based on the channel transfer matrix and the measured signal.

For example, the measured signal of the receiver to be measured is $T_i(i=1,2,\ldots m)$, and the measured signals of other receivers except the receiver $T_i$ in the $T_1, T_2, \ldots T_m$ are zero. The channel transfer matrix is the above-mentioned matrix A, and the multiple transmitted signals are the above-mentioned $MT_1, MT_2, \ldots MT_n$. Therefore, the multiple transmitted signals $MT_1, MT_2, \ldots MT_n$ may be obtained based on the above-mentioned formula (2).

At block 13, the multiple transmitted signals are transmitted through the multiple measurement antennas.

At block 14, it is determined whether a bit error rate of the receiver to be measured equals a preset bit error rate.

At block 15, in response to determining that the bit error rate does not equal the preset bit error rate, the measured signal is adjusted and the method returns to the block 12.

At block 16, in response to determining that the bit error rate equals the preset bit error rate, a power of the measured signal is determined as a radiation sensitivity of the receiver to be measured.

In embodiments of the present disclosure, the receiver to be measured and an antenna of the receiver to be measured may form an airlink system.

Figure 2:
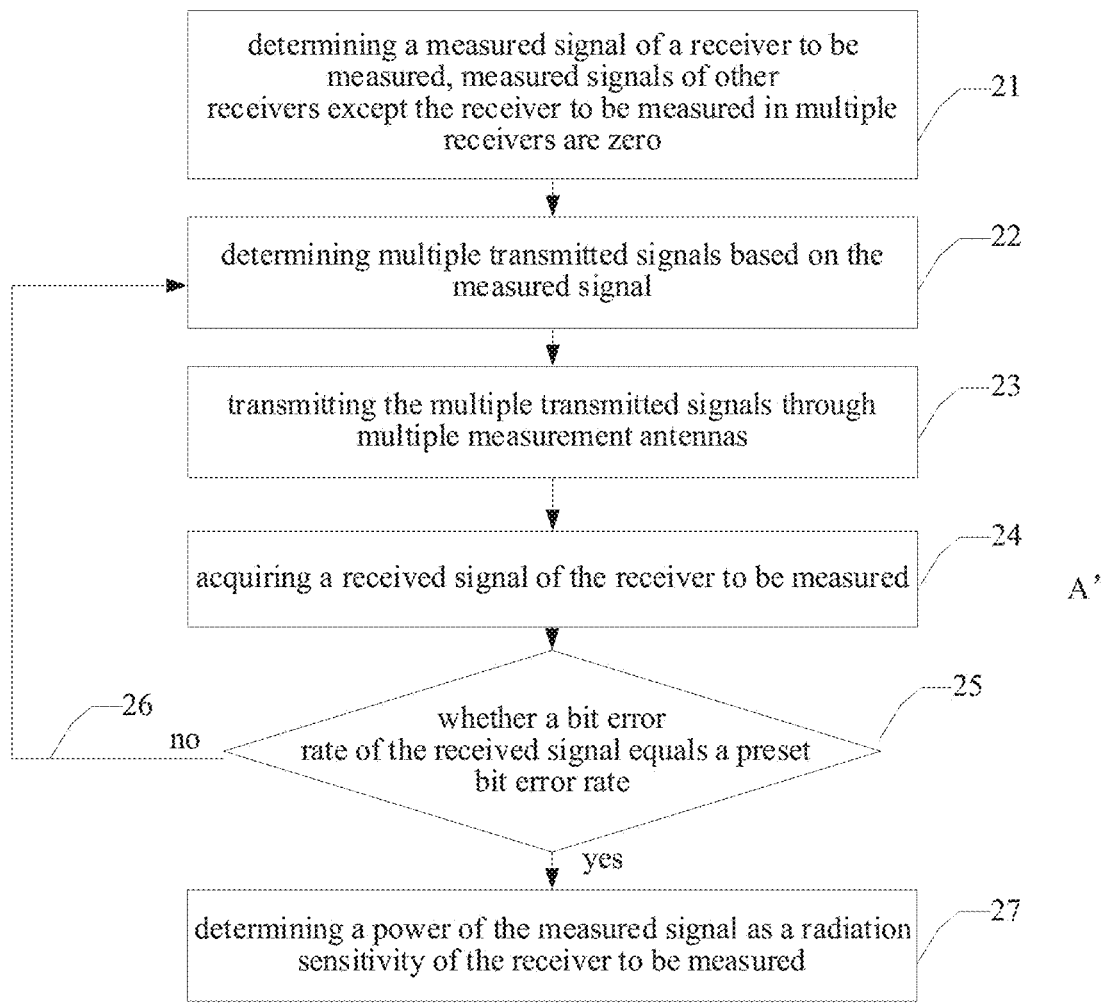
FIG. 2 is a flow chart illustrating another method for measuring wireless performance of a receiver of a wireless terminal according to embodiments of the present disclosure.

In an example, as illustrated in FIG. 2, the method for measuring wireless performance of a receiver of a wireless terminal according to the present disclosure includes blocks 21 to 27 as follows.

At block 21, a measured signal of the receiver to be measured is determined. The wireless terminal includes a plurality of receivers and measured signals of other receivers except the receiver to be measured is zero. At block 22, multiple transmitted signals are determined based on the measured signal. At block 23, the multiple transmitted signals are transmitted through the multiple measurement antennas. At block 24, a received signal of the receiver to be measured is acquired. At block 25, it is determined whether a bit error rate of the received signal equals a preset bit error rate. At block 26, in response to determining that the bit error rate does not equal the preset bit error rate, the measured signal is adjusted and the method returns to the block 22. At block 27, in response to determining that the bit error rate equals the preset bit error rate, a power of the measured signal is determined as a radiation sensitivity of the receiver to be measured.

Figure 3:
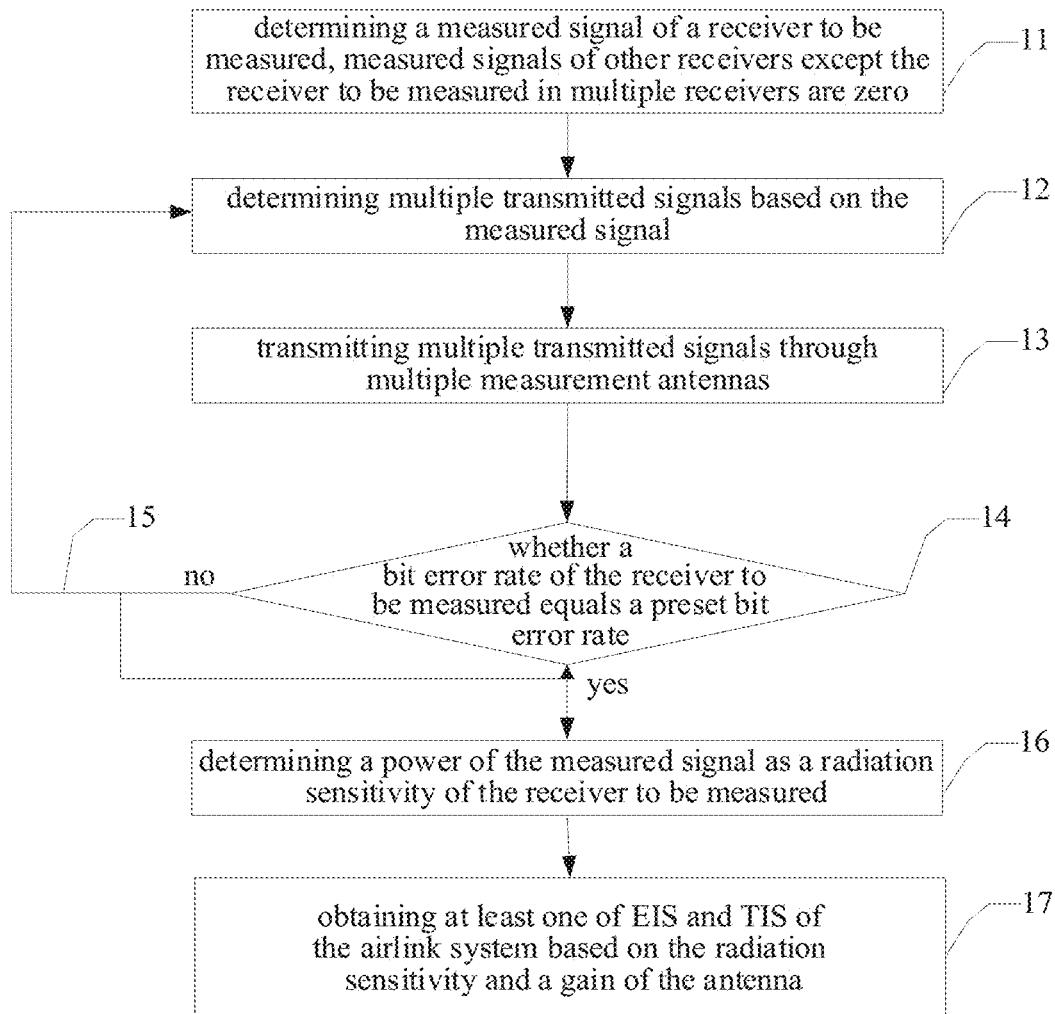
FIG. 3 is a flow chart illustrating a method for measuring wireless performance of a receiver of a wireless terminal according to embodiments of the present disclosure.

In embodiments of the present disclosure, as illustrated in FIG. 3, the method may further include the following.

At block 17, at least one of an EIS (effective isotropic sensitivity) and a TIS (total isotropic sensitivity) of the airlink system is obtained based on the radiation sensitivity and a gain of the antenna.

In embodiments of the present disclosure, the EIS may be obtained based on the radiation sensitivity and the gain of the antenna in accordance with a following formula:

$$EIS_x(\theta, \phi) = \frac{P_x}{G_{v\_x}(\theta, \phi) + G_{H\_x}(\theta, \phi)},$$

where $EIS_x(\theta,\phi)$ represents the EIS of a $x$th airlink system at angle $(\theta,\phi)$, $P_x$ represents the radiation sensitivity, $G_{v\_x}(\theta,\phi)$ represents the gain of the antenna at V polarization and angle $(\theta,\phi)$, and $G_{H\_x}(\theta,\phi)$ represents the gain of the antenna at H polarization and angle $(\theta,\phi)$.

In embodiments of the present disclosure, the TIS may be obtained based on the radiation sensitivity and the gain of the antenna in accordance with a following formula:

$$TIS_x = \frac{4\pi}{\oint \left[ \frac{G_{v\_x}(\theta, \phi) + G_{H\_x}(\theta, \phi)}{P_x} \right] \sin(\theta) d\theta d\phi},$$

where θ represents a theta angle in a spherical coordinate, φ represents a phi angle in the spherical coordinate.

Figure 4:
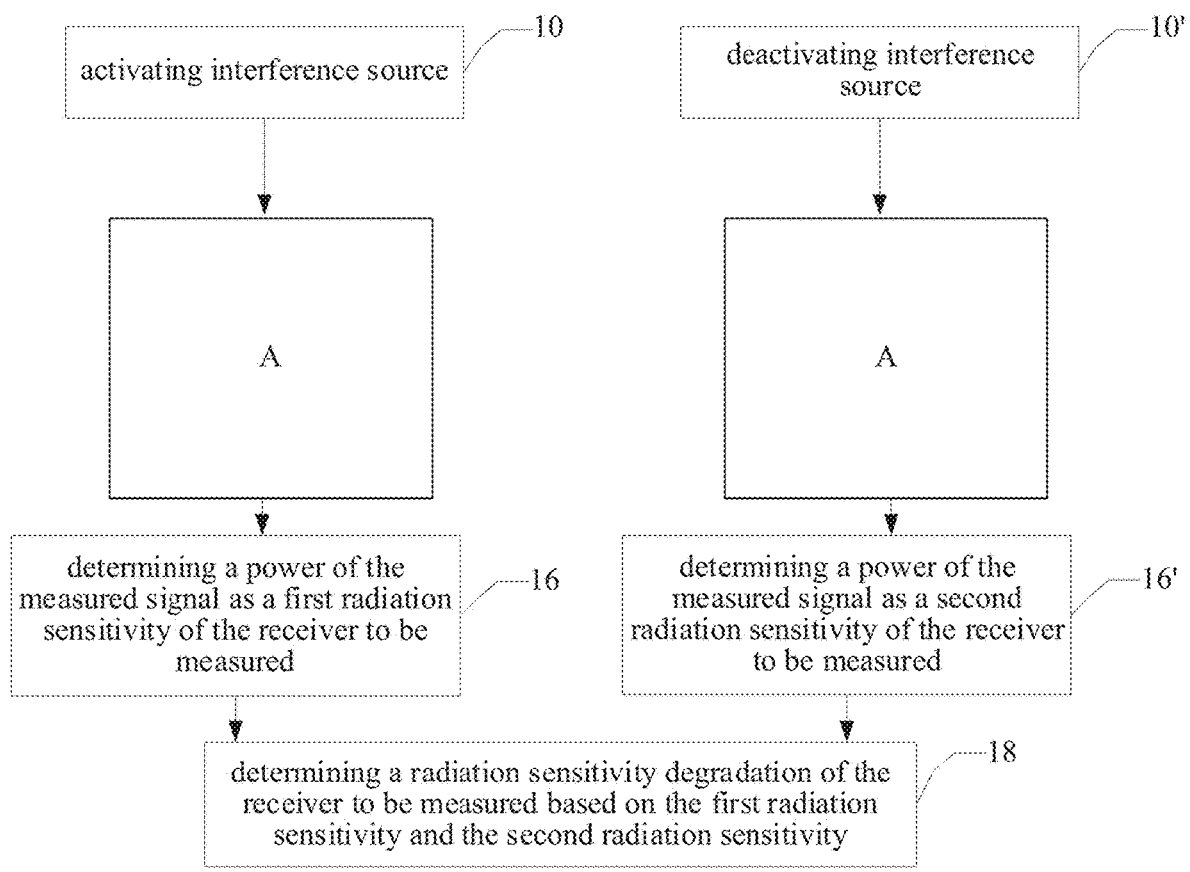
FIG. 4 is a flow chart illustrating a method for measuring wireless performance of a receiver of a wireless terminal according to embodiments of the present disclosure.

In embodiments of the present disclosure, as illustrated in FIG. 4, the method may further include the following.

At block 10, an interference source is activated to obtain a first radiation sensitivity of the receiver to be measured with an interference of the interference source. In detail, the blocks 11-16 may be performed when the interference source is activated to obtain the first radiation sensitivity of the receiver to be measured with the interference of the interference source.

At block 10', the interference source is deactivated to obtain a second radiation sensitivity of the receiver to be measured without the interference of the interference source. In detail, the blocks 11-16' may be performed when the interference source is deactivated to obtain the second radiation sensitivity of the receiver to be measured without the interference of the interference source.

Execution order of the above blocks 10 and 10' is not limited.

At block 18, a radiation sensitivity degradation of the receiver to be measured is determined based on the first radiation sensitivity and the second radiation sensitivity.

The sensitivity degradation (or desense) is a loss of sensitivity caused by noise (mainly caused by a digital circuit or a RF circuit). This noise may be the interference source, and may be from any one or more modules of the DUT, including but not limited to: the receiver, a hard disk, a camera, a screen, a memory card, etc., or an external device connected to the DUT.

In a strongly coupled MIMO system, the noise may be coupled to the antennas and contribute to the noise level of the receiver, such that the noise may significantly affect performance of the DUT. Noise measurement is valuable for both EMI (electromagnetic interference) analysis and sensitivity degradation analysis of the DUT. For example, with the noise level of LTE receiver obtained respectively when the WiFi module is activated and deactivated, the influence of the WiFi module on LTE sensitivity may be obtained.

Figure 5:
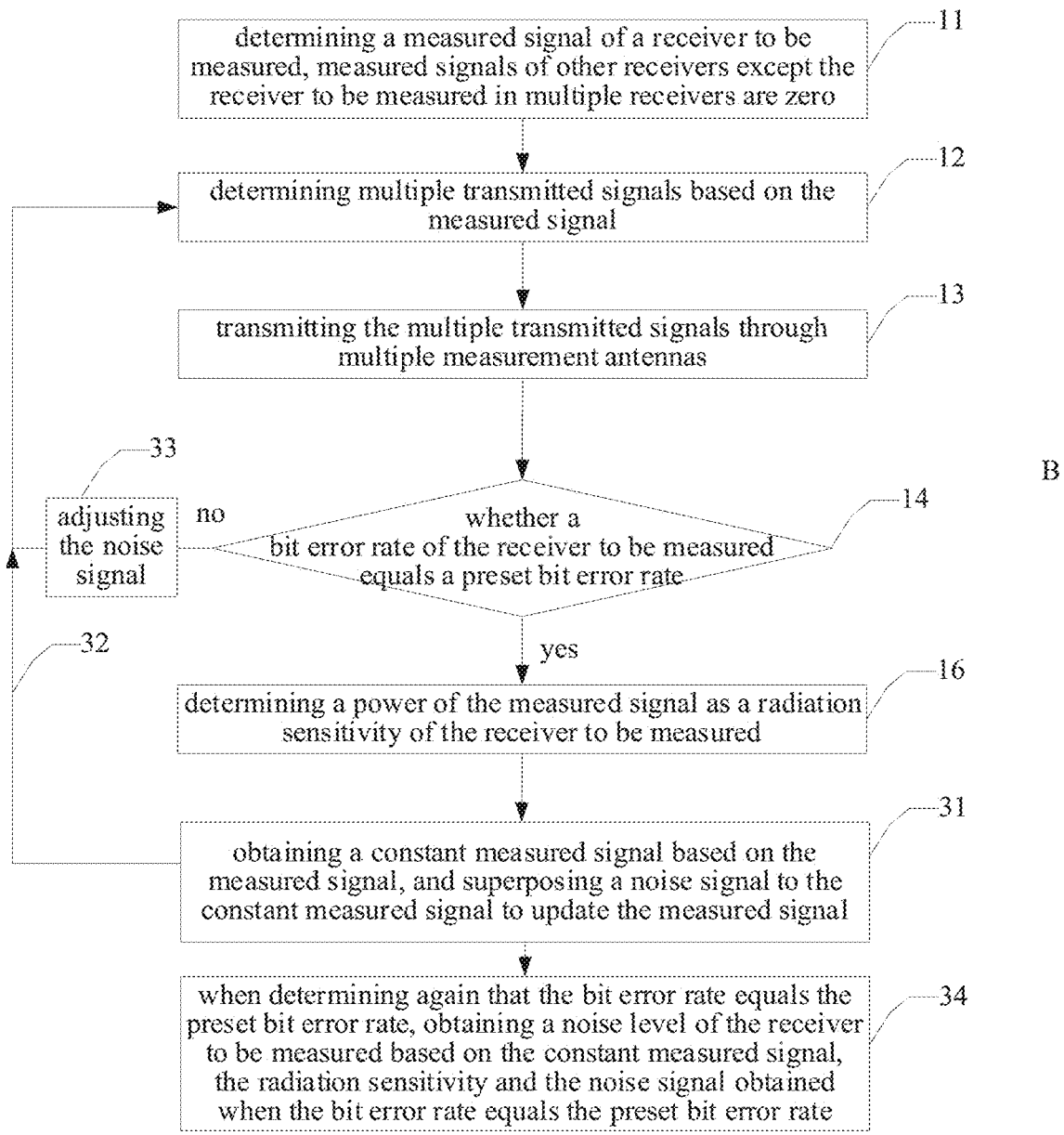
FIG. 5 is a flow chart illustrating a method for measuring wireless performance of a receiver of a wireless terminal according to embodiments of the present disclosure.

As illustrated in FIG. 5, the method may further include the following.

At block 31, in response to determining that the bit error rate equals the preset bit error rate, a constant measured signal is obtained based on the measured signal, and a noise signal is superposed to the constant measured signal to update the measured signal.

In embodiments of the present disclosure, the constant measured signal is greater than the sensitivity of the receiver by at least 3 dB.

For example, the updated measured signal of the receiver to be measured may be represented as $NT_i$(i=1,2, ... m), and the measured signals of the multiple receivers may be represent as $NT_1, NT_2, ... NT_m$ respectively. The measured signals of other receivers except the receiver of $NT_i$ in the $NT_1, NT_2, ... NT_m$ are zero. The measured signal $NT_i$(i=1, 2, ... m) includes the constant measured signal $T_{pi}$ and the noise signal $N_i$.

In embodiments of the present disclosure, the noise signal includes a lossless additive white Gaussian noise (AWGN) signal.

At block 32, the method returns to the block 12.

At block 12, for example, the multiple transmitted signals may be obtained according to a following formula (3), $$\begin{bmatrix} MT_1 \\ MT_2 \\ \vdots \\ MT_n \end{bmatrix} = \begin{bmatrix} a_{11} & a_{12} & \cdots & a_{1n} \\ a_{21} & a_{22} & \cdots & a_{2n} \\ \vdots & \vdots & \ddots & \vdots \\ a_{m1} & a_{m2} & \cdots & a_{mn} \end{bmatrix}^{-1} * \begin{bmatrix} NT_1 \\ NT_2 \\ \vdots \\ NT_m \end{bmatrix}. \quad (3)$$

At block 33, in response to determining that the bit error rate does not equal the preset bit error rate, the noise signal is adjusted, and the method returns to the block 12.

At block 34, in response to determining that the bit error rate equals the preset bit error rate, the noise level of the receiver to be measured is obtained based on the constant measured signal, the radiation sensitivity and the noise signal obtained when the bit error rate equals the preset bit error rate.

In embodiments of the present disclosure, the noise level of the receiver to be measured is obtained based on the constant measured signal, the radiation sensitivity and the noise signal obtained when the bit error rate equals the preset bit error rate in accordance with the following formula:

$$N_{nor\_x} = \frac{P_x * N'_x}{T_{px} - P_x},$$

where, $N_{nor\_x}$ represents the noise level, $P_x$ represents the radiation sensitivity, $N'_x$ represents the noise signal obtained when the bit error rate equals the preset bit error rate, and $T_{px}$ represents the constant measured signal.

Figure 6:
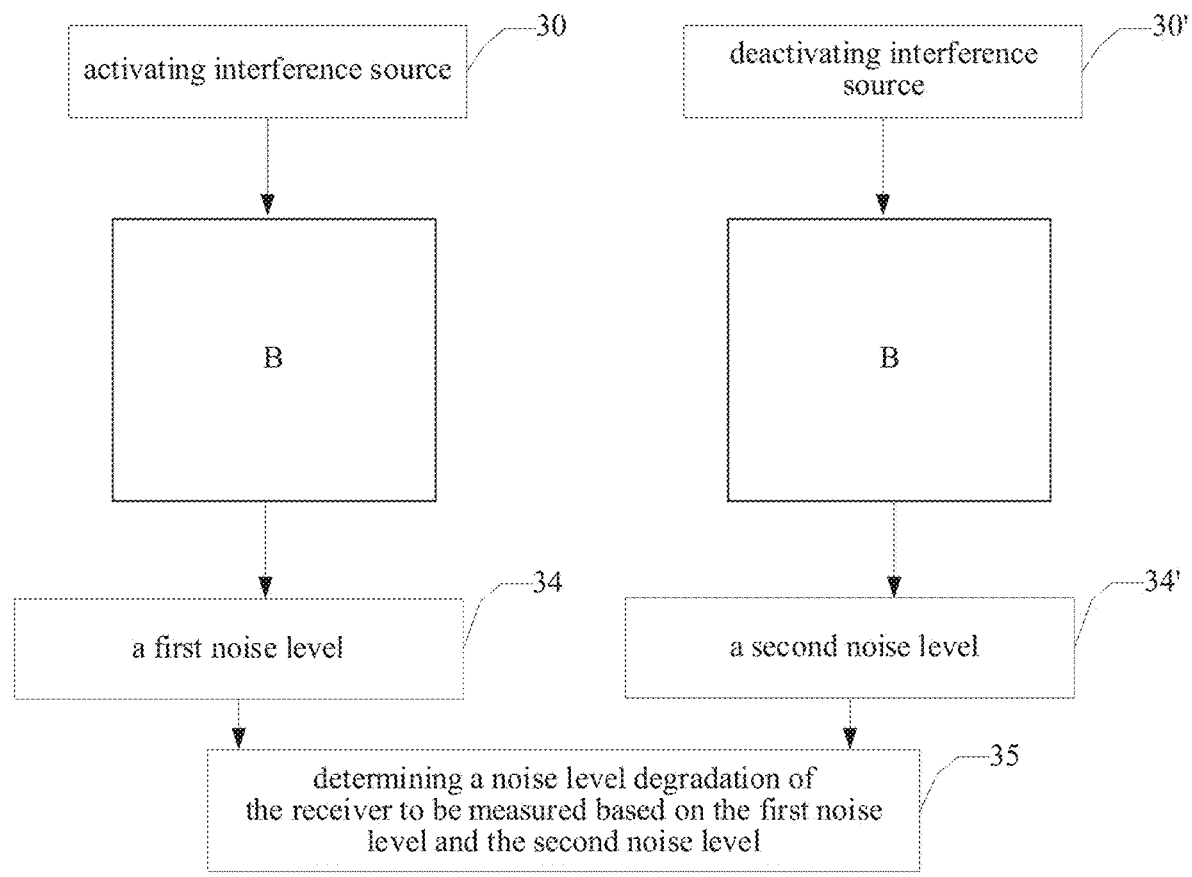
FIG. 6 is a flow chart illustrating a method for measuring wireless performance of a receiver of a wireless terminal according to embodiments of the present disclosure.

In embodiments of the present disclosure, as illustrated in FIG. 6, the method may further include the following.

At block 30, the interference source is activated to obtain a first noise level of the receiver to be measured with the interference of the interference source. In detail, the above-described blocks may be performed when the interference source is activated to obtain the first noise level of the receiver to be measured with the interference of the interference source.

At block 30', the interference source is deactivated to obtain a second noise level of the receiver to be measured without the interference of the interference source. The above-described operations may be performed when the interference source is deactivated to obtain the second noise level of the receiver to be measured without the interference of the interference source.

At block 35, a noise level degradation of the receiver to be measured is determined based on the first noise level and the second noise level.

Execution order of the above block 30 and 30' is not limited.

The method according to the present disclosure may be described below by taking a 2×2 MIMO DUT as an example.

Figure 7:
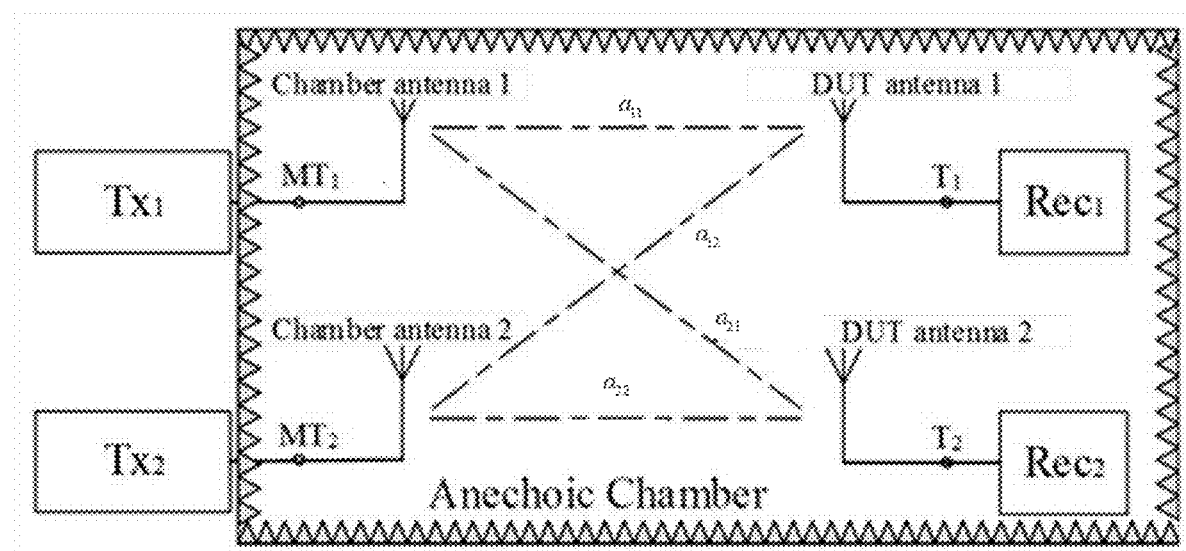
FIG. 7 is a diagram illustrating a relation between transmitted signals and measured signals in an example of the present disclosure.

As illustrated in FIG. 7, the 2×2 MIMO DUT includes two receivers (i.e., $Rec_1$ and $Rec_2$). Antennas corresponding to the receivers are DUT antenna 1 and DUT antenna 2 respectively. The measured signals at the input ports of the receivers are $T_1$ and $T_2$ respectively. The anechoic chamber includes two measurement antennas, i.e., Chamber antenna 1 and Chamber antenna 2, and the corresponding transmitted signals are $MT_1$ and $MT_2$. $Tx_1$ and $Tx_2$ represent test ports of the instrument for feeding signals to the measurement antennas, i.e., Chamber antenna 1 and Chamber antenna 2.

In step S101, the measured signal at the input port of the receiver $Rec_1$ is $T_1$, the measured signal at the input port of the receiver $Rec_2$ is 0, and the transmitted signals of the measurement antennas, i.e., Chamber antenna 1 and Chamber antenna 2, may be obtained through the channel transfer matrix A as follows:

$$\begin{bmatrix} MT_1 \\ MT_2 \end{bmatrix} = \begin{bmatrix} a_{11} & a_{12} \\ a_{21} & a_{22} \end{bmatrix}^{-1} * \begin{bmatrix} T_1 \\ 0 \end{bmatrix}.$$

In step S102, the transmitted signals obtained in step S101 are fed to the measurement antennas, and the transmitted signals are radiated to the DUT through the measurement antennas to obtain the bit error rate $BER_1$ of the receiver $Rec_1$.

In step S103, the power of $T_1$ is adjusted, until the bit error rate $BER_1$ of the receiver $Rec_1$ equals the preset bit error rate $BER_0$. The power of the measured signal $T'_1$ corresponding to the bit error rate $BER_0$ may be determined as the radiation sensitivity $P_1$ of the receiver.

Similarly, the radiation sensitivity $P_2$ of the receiver $Rec_2$ may be obtained according to steps S101-S103.

In the method according to the present disclosure, based on the radiation sensitivity and the gain of the antenna, the EIS (effective isotropic sensitivity) value or/and the TIS (total isotropic sensitivity) value of each airlink system of the DUT may be obtained. In detail, the EIS value of a first airlink system composed of the receiver $Rec_1$ and its corresponding DUT antenna 1 may be:

$$EIS_1(\theta, \phi) = \frac{P_1}{G_{v\_1}(\theta, \phi) + G_{H\_1}(\theta, \phi)},$$

where, $EIS_1(\theta,\phi)$ represents the EIS of the first airlink system at angle $(\theta,\phi)$, $P_1$ represents the radiation sensitivity, $G_{v\_1}(\theta,\phi)$ represents the gain of the antenna at V polarization and angle $(\theta,\phi)$, and $G_{H\_1}(\theta,\phi)$ represents the gain of the antenna at H polarization and angle $(\theta,\phi)$ Similarly, the EIS value of a second airlink system composed of the receiver $Rec_2$ and its corresponding DUT antenna 2 may be:

$$EIS_2(\theta, \phi) = \frac{P_2}{G_{v\_2}(\theta, \phi) + G_{H\_2}(\theta, \phi)}.$$

According to CTIA test standard, the TIS value is a value that expresses three-dimensional reception performance of the DUT by spherical integral. The TIS value of the first airlink system is:

$$TIS_1 = \frac{1}{\frac{1}{4\pi} * \oint \left[\frac{1}{EIS_1(\theta,\phi)}\right] \sin(\theta) d\theta d\phi} = \frac{4\pi}{\oint \left[\frac{G_{v\_1}(\theta,\phi) + G_{H\_1}(\theta,\phi)}{P_1}\right] \sin(\theta) d\theta d\phi}.$$

In the present disclosure, the method for measuring the radiation sensitivity degradation includes the following. Steps S101 to S103 are executed when the interference source is off and on respectively, and the radiation sensitivity degradation of the receiver caused by the interference source is obtained based on a difference value of two measurement results.

Figure 8:
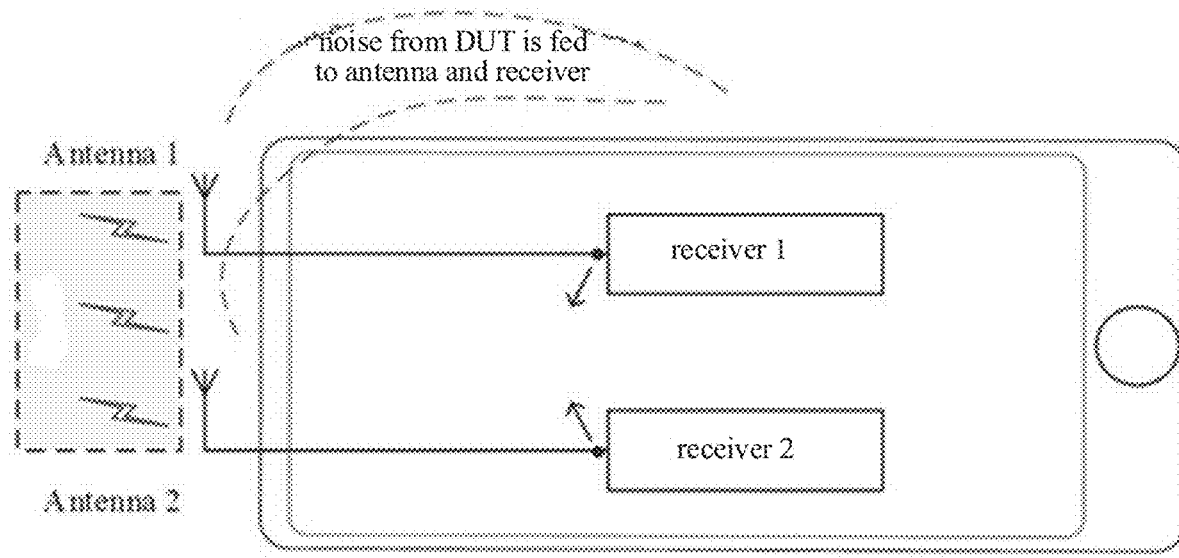
FIG. 8 is a diagram illustrating that noise generated by a MIMO wireless terminal is coupled to an antenna and contributes to a noise level of a receiver.

In the strongly coupled MIMO system, the noise may be coupled to the antennas and contribute to the noise level of the receiver, such that the noise may significantly affect the performance of the DUT, as illustrated in FIG. 8. Therefore, the noise measurement is valuable for both EMI (electromagnetic interference) analysis and sensitivity degradation analysis of the DUT. For example, with the noise level of the LTE receiver obtained respectively when the WiFi module is on and off, the influence of the WiFi module on the LTE sensitivity may be obtained. In the present disclosure, the method for measuring the noise of the receiver may include the following.

In step S201, the measured signal at the input port of the receiver $Rec_1$ is $NT_1$ which includes the constant measured signal $T_{p1}$ and the noise signal $N_1$. For the receiver $Rec_2$, there is no measured signal at the input port. Therefore, the transmitted signals in this case may be obtained through the transmission matrix A, as follows:

$$\begin{bmatrix} MT_1 \\ MT_2 \end{bmatrix} = \begin{bmatrix} a_{11} & a_{12} \\ a_{21} & a_{22} \end{bmatrix}^{-1} * \begin{bmatrix} NT_1 \\ 0 \end{bmatrix}.$$

In step S202, the transmitted signals obtained in step S201 are fed to the measurement antennas, and the transmitted signals are radiated to the DUT through the measurement antennas to obtain the bit error rate $BER_1$ of the receiver $Rec_1$.

In step S203, the power of the constant measured signal $T_{p1}$ is kept unchanged, and the power of the noise signal $N_1$ is adjusted until the bit error rate of the receiver $Rec_1$ equals the preset bit error rate $BER_0$ mentioned in the step S103. In this case, the noise signal corresponding to the bit error rate $BER_0$ is $N'_1$, and the noise level of the receiver $Rec_1$ may be obtained as $$N_{nor\_1} = \frac{P_1 * N'_1}{T_{p1} - P_1}.$$

The calculation in the step S203 may be described in detail below. For a receiver, given unchanged frequency and unchanged protocol mode, a fixed bit error rate BER may correspond to a fixed signal-to-noise ratio (SNR). The relation between the BER and SNR may be as follows:

$$BER = \frac{1}{2} \text{erfc}\left(\sqrt{\frac{SNR}{f_{bit}}}\right).$$

where, SNR represents a SNR value of the measured signal at the input port of the receiver, $f_{bit}$ is a bit rate which is considered as a constant under an unchanged frequency and protocol mode.

Then, $$\frac{P_1}{N_{nor\_1}} = \frac{T_{p1}}{N_{nor\_1} + N'_1}.$$

The above formula may be equivalent to:

$$N_{nor\_1} * (T_{p1} - P_1) = N'_1 * P_1,$$

when $T_{p1} \gg P_1$, for example, $T_{p1}$ is greater than $P_1$ by at least 3 dB:

$$N_{nor\_1}*(T_{p1}-P_1) \approx N_{nor\_1}*(T_{p1}),$$

then $$N'_1*P_1 \approx N_{nor\_1}*(T_{p1}),$$

that is $$\frac{P_1}{N_{nor\_1}} \approx \frac{T_{p1}}{N'_1},$$

therefore, $N_{nor\_1}$ may be approximately obtained as:

$$N_{nor\_1} = \frac{P_1 * N'_1}{T_{p1}}.$$

Similarly, the noise level $N_{nor\_2}$ of the receiver $R_2$ may be obtained according to the steps S201 to S203 described above.

In the present disclosure, the method for measuring noise caused by the interference source may include the following. The measuring methods of steps S201 to S303 are executed when the interference source is on and off respectively, and the noise level caused by the interference source is obtained based on a difference value of two measuring results.

Figure 9:
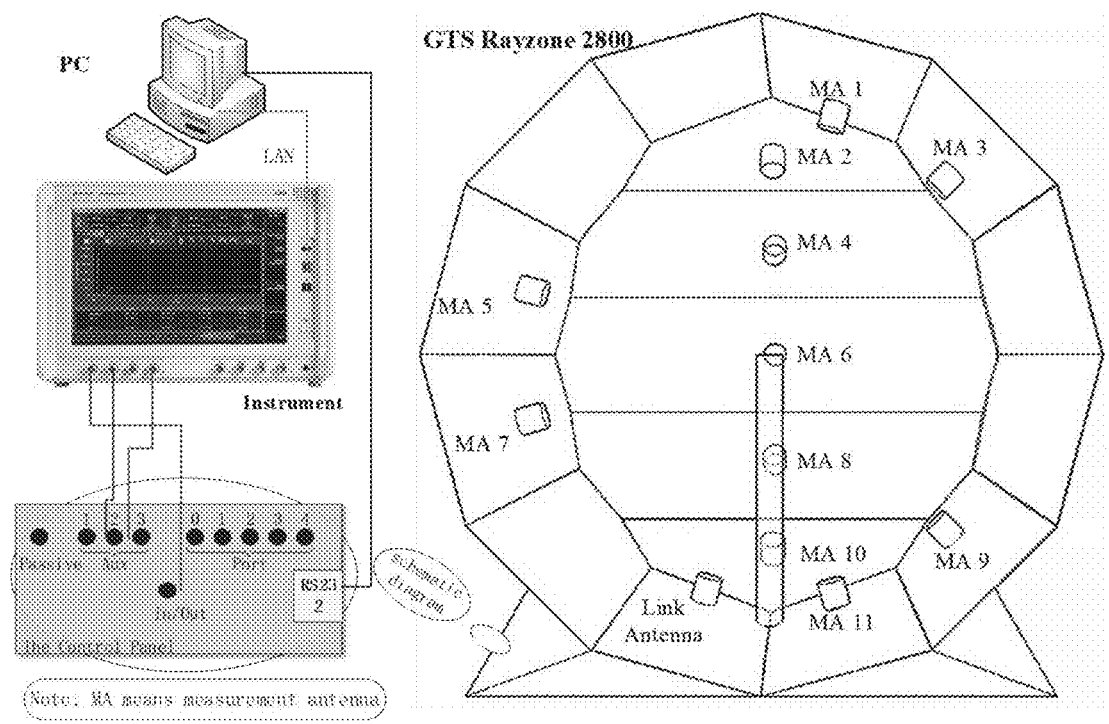
FIG. 9 is a schematic diagram illustrating an implementation of a measurement system according to the present disclosure.

Herein, in order to clearly describe the influence of noise on the MIMO DUT, in embodiments, a 2×2 MIMO tablet computer is subjected to the measurement, and a camera module is used as the interference source. The measurement is performed when the camera module of the tablet computer is turned off and turned on, respectively. The measurement system is illustrated in FIG. 9. The measurement system includes the anechoic chamber (e.g. GTS Rayzone 2800), the measurement antennas (e.g., MA 1-MA 11), a link antenna, and a computer PC for measurement operation and outputting a result. In addition, a measurement instrument (e.g., Instrument) for implementing the method according to the present disclosure may be integrated in the measurement system. The PC may be connected to the measurement instrument via LAN (local area network). The computer PC may also be connected to the measurement instrument via RS 232. The measuring instrument includes a control panel. The control panel includes a passive port, auxiliary ports Aux 1-3, ports 0-4, and an input/output port (e.g., In/Out). The measurement system settings of the measurement instrument (e.g. Instrument) are shown in table 1 below:

TABLE 1

| measurement instrument | Keysight UXM |
|---|---|
| anechoic chamber | GTS RayZone2800 |
| downlink frequency | 2132.5 MHz |
| Protocol | FDD |
| DUT | Samsung Tab 2 |
| channel model | SCME UMi |

It should be noted that, in the example, when the receiver operates at the BER of 4%, the power of the measured signal received by the receiver is determined as the radiation sensitivity.

The measurement results are shown in table 2 below:

TABLE 2

| parameter | camera is off | camera is on | difference value |
|---|---|---|---|
| $P_1$ | −99.05 dBM | −89.12 dBM | −9.93 dB |
| $P_2$ | −97.21 dBM | −94.78 dBM | −2.43 dB |
| $T/S_1$ | −94.33 dBM | −84.40 dBM | −9.93 dB |
| $T/S_2$ | −91.71 dBM | −89.28 dBM | −2.43 dB |
| $N_{nor\_1}$ | −99.55 dBM | −89.75 dBM | −9.80 dB |
| $N_{nor\_2}$ | −97.72 dBM | −93.35 dBM | −2.37 dB |

Figure 10:
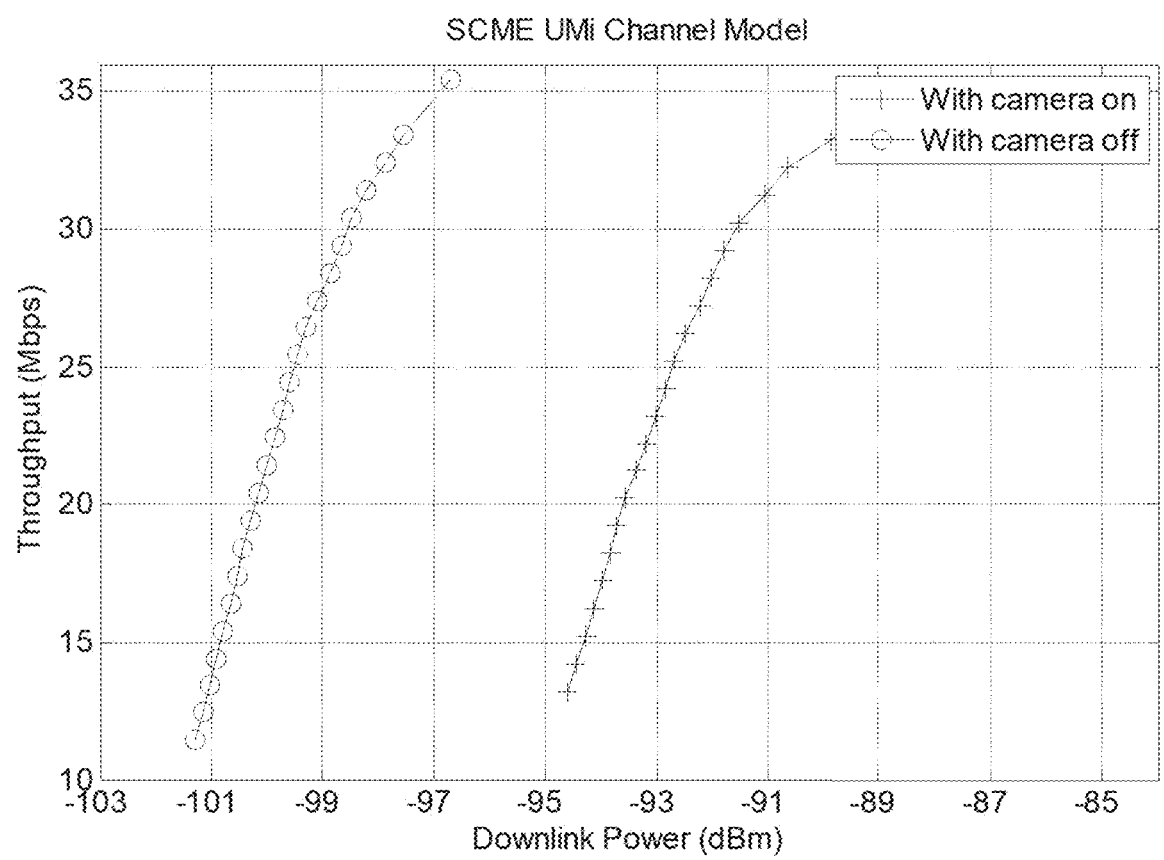
FIG. 10 illustrates a measurement result of throughput measured by a MIMO tablet when the camera is on and off according to implementations of the present disclosure.

FIG. 10 illustrates a measurement result of throughput when the camera is on and off. As illustrated in FIG. 10, "Throughput" represents the throughput, "With camera on" represents that the camera is on, "With camera off" represents that the camera is off, "SCME UMi Channel Model" represents a channel model extended by a spatial channel model.

The above measurement result shows that the radiation sensitivity degradation of the receiver $R_1$ resulted from the desense caused by the camera circuit is 9.93dB and the radiation sensitivity degradation of the receiver $R_2$ is 2.43 dB. The TIS degradation of the receiver $R_1$ is 9.93 dB, and the TIS degradation of the receiver $R_2$ is 2.43 dB. The noise level is increased by 9.80 dB for the receiver $R_1$ and the noise level is increased by 2.37 dB for the receiver $R_2$. In addition, the camera circuitry further results in a significant degradation in the throughput of about 6.8 dB.

It may be seen that, the degradation of the receiver $R_1$ by the camera circuitry is more significant than that of the receiver $R_2$. In the tablet computer to be tested, the camera is closer to a feeding point of the antenna 1 than the feeding point of the antenna 2. Therefore, the above measurement results are reasonable. The measurement results obtained by the method according to the present disclosure may reflect the wireless performance of each part of the MIMO wireless terminal in an operation state, and may diagnose a noise source. A great reference may be provided for an engineer to diagnose problems and improve design in a development and production of MIMO wireless terminal products.

Another embodiment of the present disclosure provides a computer readable storage medium. The computer readable storage medium has a computer program stored thereon. When the computer program is executed by a processor, methods described in embodiments are executed.

Another embodiment of the present disclosure is a measuring apparatus. The measuring apparatus includes a memory, the processor, and the computer program stored in the memory and executable on the processor. The processor is configured to execute the computer program to execute the methods described in the embodiments.

It should be noted that the embodiments of the present disclosure can be implemented by various means, for example, hardware, firmware, software, or a combination thereof.

The above content is a detailed description of the present disclosure in connection with specific embodiments and it is not intended to limit the present disclosure to any specific embodiment. For those ordinary skilled in the art, alternatives or modifications to the described embodiments may be made without departing from the concept of the present disclosure, and these alternatives or modifications should be considered as falling within the scope of the present disclosure.

What is claimed is:

1. A method for measuring wireless performance of a receiver of a wireless terminal, comprising:
for each measurement of a wireless performance of a receiver comprised in a wireless terminal comprising a plurality of receivers, determining a plurality of transmit signals based on predetermined target values for signals received at input ports of the plurality of receivers and a channel transfer matrix from a plurality of measurement antennas to the plurality of receivers;
determining, based on the channel transfer matrix, the plurality of transmit signals such that the input port of an under-test receiver measures non-zero received signal and the input ports of other receivers measure zero received signal;
transmitting the plurality of transmit signals through a plurality of measurement antennas;
determining whether a bit error rate of the under-test receiver equals a preset bit error rate;
in response to determining that the bit error rate does not equal the preset bit error rate, adjusting the predetermined target value for the under-test receiver and redetermining the plurality of transmitted signals based on the channel transfer matrix and the adjusted predetermined target value; and
in response to determining that the bit error rate equals the preset bit error rate, determining a power of the measured received signal for the under-test receiver as a radiation sensitivity of the under-test receiver.

2. The method of claim 1, wherein, the plurality of receivers comprise m receivers, the plurality of measurement antennas comprise n measurement antennas, where n and m are positive integers greater than or equal to 2, and the channel transfer matrix A from the n measurement antennas to the m receivers is:

$$A = \begin{bmatrix} a_{11} & a_{12} & \cdots & a_{1n} \\ a_{21} & a_{22} & \cdots & a_{2n} \\ \vdots & \vdots & \ddots & \vdots \\ a_{m1} & a_{m2} & \cdots & a_{mn} \end{bmatrix},$$

where, $a_{ij}$ represents a path complex gain from a measurement antenna j to a receiver i; $a_{ij}=G(tx\_ant,ij)+P_{ij}+G(rx\_anti,ij), i=1,2,\ldots,m; j=1,2,\ldots,n$; $G(tx\_antj,ij)$ represents a gain of the measurement antenna j to the receiver i, $G(rx\_anti, ij)$ represents a gain of a receiving antenna of the receiver i to the measurement antenna j, $P_{ij}$ represents a spatial path loss from the measurement antenna j to the receiver i; and
wherein transmitting the plurality of transmitted signals further comprises transmitting the plurality of transmitted signals in accordance with a following formula:

$$\begin{bmatrix} MT_1 \\ MT_2 \\ \vdots \\ MT_n \end{bmatrix} = \begin{bmatrix} a_{11} & a_{12} & \cdots & a_{1n} \\ a_{21} & a_{22} & \cdots & a_{2n} \\ \vdots & \vdots & & \vdots \\ a_{m1} & a_{m2} & \cdots & a_{mn} \end{bmatrix}^{-1} * \begin{bmatrix} T_1 \\ T_2 \\ \vdots \\ T_m \end{bmatrix}$$

where, $$\begin{bmatrix} MT_1 \\ MT_2 \\ \vdots \\ MT_n \end{bmatrix}$$

represents the n transmitted signals, $$\begin{bmatrix} T_1 \\ T_2 \\ \vdots \\ T_m \end{bmatrix}$$

represents the m measured signals of m receivers, if the measured signal of the under-test receiver is $T_x$, $x=1, 2,\ldots,m$, the measured signals of the other receivers are zero.

3. The method of claim 1, wherein the receiver and an antenna of the receiver form an airlink system, and the method further comprises:
obtaining at least one of EIS (effective isotropic sensitivity) and TIS (total isotropic sensitivity) of the airlink system based on the radiation sensitivity and a gain of the antenna.

4. The method of claim 3, wherein the EIS is obtained based on the radiation sensitivity and the gain of the antenna in accordance with a following formula:

$$EIS_x(\theta, \phi) = \frac{P_x}{G_{v\_x}(\theta, \phi) + G_{H\_x}(\theta, \phi)},$$

where $EIS_x(\theta,\phi)$ represents the EIS of a xth airlink system at angle $(\theta,\phi)$, $P_x$ represents the radiation sensitivity, $G_{v\_x}(\theta,\phi)$ represents the gain of the antenna at V polarization and angle $(\theta,\phi)$, and $G_{H\_x}(\theta,\phi)$ represents the gain of the antenna at H polarization and angle $(\theta,\phi)$; and
the TIS is obtained based on the radiation sensitivity and the gain of the antenna in accordance with a following formula:

$$TIS_x = \frac{4\pi}{\oint \left[ \frac{G_{v\_x}(\theta, \phi) + G_{H\_x}(\theta, \phi)}{P_x} \right] \sin(\theta) d\theta d\phi},$$

where $\theta$ represents a theta angle in a spherical coordinate, $\phi$ represents a phi angle in the spherical coordinate.

5. The method of claim 1, further comprising:
activating an interference source to obtain a first radiation sensitivity of the receiver with an interference of the interference source;
deactivating the interference source to obtain a second radiation sensitivity of the receiver without the interference of the interference source; and
determining a radiation sensitivity degradation of the receiver based on the first radiation sensitivity and the second radiation sensitivity.

6. The method of claim 1, further comprising:
in response to determining that the bit error rate equals the preset bit error rate, obtaining a constant measured signal for the under-test receiver, and superposing a noise signal to the constant measured signal to update the measured signal;
returning to determining the plurality of transmitted signals;
in response to determining that the bit error rate does not equal the preset bit error rate, adjusting the noise signal, and returning to superposing the noise signal to the constant measured signal; and in response to determining that the bit error rate equals the preset bit error rate, obtaining a noise level of the receiver based on the constant measured signal, the radiation sensitivity and the noise signal obtained when the bit error rate equals the preset bit error rate.

7. The method of claim 6, wherein the noise level of the receiver is obtained based on the constant measured signal, the radiation sensitivity and the noise signal obtained when the bit error rate equals the preset bit error rate in accordance with the following formula:

$$N_{nor\_x} = \frac{P_x * N'_x}{T_{px} - P_x},$$

where, $N_{nor\_x}$ represents the noise level, $P_x$ represents the radiation sensitivity, $N'_x$ represents the noise signal obtained when the bit error rate equals the preset bit error rate, and $T_{px}$ represents the constant measured signal.

8. The method of claim 6, wherein the constant measured signal is greater than the sensitivity of the receiver by at least 3dB.

9. The method of claim 6, further comprising:
activating an interference source to obtain a first noise level of the receiver with an interference of the interference source;
deactivating the interference source to obtain a second noise level of the receiver without interference of the interference source; and
determining a noise level degradation of the receiver based on the first noise level and the second noise level.

10. An apparatus for measuring wireless performance of a receiver of a wireless terminal, comprising:
an anechoic chamber, comprising a plurality of measurement antennas; and
a controller, configured to:
for each measurement of a wireless performance of a receiver comprised in a wireless terminal comprising a plurality of receivers, determine a plurality of transmit signals based on predetermined target values for signals received at input ports of the plurality of receivers and a channel transfer matrix from a plurality of measurement antennas to the plurality of receivers;
determine, based on the channel transfer matrix, the plurality of transmit signals such that the input port of an under-test receiver measures non-zero received signal and the input ports of other receivers measure zero received signal;
transmit the plurality of transmit signals through a plurality of measurement antennas; and
determine whether a bit error rate of the under-test receiver equals a preset bit error rate;
in response to determining that the bit error rate does not equal the preset bit error rate, adjust the predetermined target value for the under-test receiver, and redetermine the plurality of transmitted signals based on the channel transfer matrix and the adjusted measured signals; and
in response to determining that the bit error rate equals the preset bit error rate, determine a power of the measured received signal for the under-test receiver as a radiation sensitivity of the under-test receiver.

11. The apparatus according to claim 10, wherein the plurality of receivers comprise m receivers, the plurality of measurement antennas comprise n measurement antennas, where n and m are positive integers greater than or equal to 2, and the channel transfer matrix A from the n measurement antennas to the m receivers is:

$$A = \begin{bmatrix} a_{11} & a_{12} & \cdots & a_{1n} \\ a_{21} & a_{22} & \cdots & a_{2n} \\ \vdots & \vdots & \ddots & \vdots \\ a_{m1} & a_{m2} & \cdots & a_{mn} \end{bmatrix},$$

where, $a_{ij}$ represents a path complex gain from a measurement antenna j to a receiver i; $a_{ij}$=G(tx_antj,ij)+$P_{ij}$+G (rx_anti,ij),i=1,2, . . . ,n; G(tx_antj,ij) represents a gain of the measurement antenna j to the receiver i, G(rx_anti, ij) represents the gain of a receiving antenna of the receiver i to the measurement antenna j, $P_{ij}$ represents a spatial path loss from the measurement antenna j to the receiver i; and
wherein the controller is further configured to: obtain the plurality of transmitted signals in accordance with a following formula:

$$\begin{bmatrix} MT_1 \\ MT_2 \\ \vdots \\ MT_n \end{bmatrix} = \begin{bmatrix} a_{11} & a_{12} & \cdots & a_{1n} \\ a_{21} & a_{22} & \cdots & a_{2n} \\ \vdots & \vdots & & \\ a_{m1} & a_{m2} & \cdots & a_{mn} \end{bmatrix}^{-1} * \begin{bmatrix} T_1 \\ T_2 \\ \vdots \\ T_m \end{bmatrix}$$

where, $$\begin{bmatrix} MT_1 \\ MT_2 \\ \vdots \\ MT_n \end{bmatrix}$$

represents the n transmitted signals, $$\begin{bmatrix} T_1 \\ T_2 \\ \vdots \\ T_m \end{bmatrix}$$

represents the m measured signals of m receivers, if the measured signal of the under-test receiver is $T_x$, x=1, 2, . . . ,m, the measured signals of the other receivers are zero.

12. The apparatus of claim 10, wherein the receiver and an antenna of the receiver form an airlink system, and the controller is further configured to:
obtain at least one of EIS (effective isotropic sensitivity) and TIS (total isotropic sensitivity) of the airlink system based on the radiation sensitivity and a gain of the antenna.

13. The apparatus of claim 12, wherein the controller is configured to:
obtain the EIS based on the radiation sensitivity and the gain of the antenna in accordance with a following formula:

$$EIS_x(\theta, \phi) = \frac{P_x}{G_{v\_x}(\theta, \phi) + G_{H\_x}(\theta, \phi)},$$

where, $EIS_x(\theta,\phi)$ represents the EIS of a $_x$th airlink system at angle $(\theta,\phi)$, $P_x$ represents the radiation sensitivity, $G_{v\_x}(\theta,\phi)$ represents the gain of the antenna at V polarization and angle $(\theta,\phi)$, and $G_{H\_x}(\theta,\phi)$ represents the gain of the antenna at H polarization and angle $(\theta,\phi)$; and obtain the TIS based on the radiation sensitivity and the gain of the antenna in accordance with a following formula:

$$TIS_x = \frac{4\pi}{\oint \left[ \frac{G_{v\_x}(\theta, \phi) + G_{H\_x}(\theta, \phi)}{P_x} \right] \sin(\theta) d\theta d\phi},$$

where, $\theta$ represents a theta angle in a spherical coordinate, $\phi$ represents a phi angle in the spherical coordinate.

14. The apparatus of claim 10, wherein the controller is configured to:
    activate an interference source to obtain a first radiation sensitivity of the receiver with an interference of the interference source;
    deactivate the interference source to obtain a second radiation sensitivity of the receiver without the interference of the interference source; and
    determine a radiation sensitivity degradation of the receiver based on the first radiation sensitivity and the second radiation sensitivity.

15. The apparatus of claim 10, wherein the controller is configured to:
    in response to determining that the bit error rate equals the preset bit error rate, obtain a constant measured signal for the under-test receiver, and superposing a noise signal to the constant measured signal to update the measured signal;
    return to determining the plurality of transmitted signals;
    in response to determining that the bit error rate does not equal the preset bit error rate, adjust the noise signal, and returning to superposing the noise signal to the constant measured signal; and
    in response to determining that the bit error rate equals the preset bit error rate, obtain a noise level of the receiver based on the constant measured signal, the radiation sensitivity and the noise signal obtained when the bit error rate equals the preset bit error rate.

16. The apparatus of claim 15, wherein the constant measured signal is greater than the sensitivity of the receiver by at least 3dB.

17. The apparatus of claim 15, wherein the controller is further configured to:
    activate an interference source to obtain a first noise level of the receiver with an interference of the interference source;
    deactivate the interference source to obtain a second noise level of the receiver without the interference of the interference source; and
    determine a noise level degradation of the receiver based on the first noise level and the second noise level.

18. A non-transitory computer-readable storage medium, having a computer program stored thereon, wherein when the computer program is executed by a processor, a method for measuring wireless performance of a receiver of a wireless terminal is executed, the method comprising:
    for each measurement of a wireless performance of a receiver comprised in a wireless terminal comprising a plurality of receivers, determining a plurality of transmit signals based on predetermined target values for signals received at input ports of the plurality of receivers and a channel transfer matrix from a plurality of measurement antennas to the plurality of receivers;
    determining, based on the channel transfer matrix, the plurality of transmit signals such that the input port of an under-test receiver measures non-zero received signal and the input ports of other receivers measure zero received signal;
    transmitting the plurality of transmit signals through a plurality of measurement antennas; and
    determining whether a bit error rate of the under-test receiver equals a preset bit error rate;
    in response to determining that the bit error rate does not equal the preset bit error rate, adjusting the predetermined target values for the under-test receiver and redetermining the plurality of transmitted signals based on the channel transfer matrix and the adjusted predetermined target values; and
    in response to determining that the bit error rate equals the preset bit error rate, determining a power of the measured received signal for the under-test receiver as a radiation sensitivity of the under-test receive.

\* \* \* \* \*